United States Patent [19]
Schelling et al.

[11] Patent Number: 5,988,679
[45] Date of Patent: Nov. 23, 1999

[54] DEVICE FOR ADJUSTING THE LENGTH, AND/OR HEIGHT, AND/OR TILT OF A STEERING COLUMN OF A MOTOR VEHICLE

[75] Inventors: Raymond Schelling, Sargans, Switzerland; Heike-Michael Verling, Gamprin, Germany

[73] Assignee: Etablissement Supervis, Vaduz, Liechtenstein

[21] Appl. No.: 08/954,013

[22] Filed: Oct. 20, 1997

[30] Foreign Application Priority Data

Oct. 19, 1996 [DE] Germany ................ 196 43 203

[51] Int. Cl.⁶ .................................................. B62D 1/18
[52] U.S. Cl. .............................................. 280/775; 74/493
[58] Field of Search .................................. 280/775, 777; 74/493

[56] References Cited

U.S. PATENT DOCUMENTS

| | | | |
|---|---|---|---|
| 5,161,425 | 11/1992 | Baskett et al. | 280/775 |
| 5,555,772 | 9/1996 | Schneider | 280/775 |
| 5,743,150 | 4/1998 | Fevre et al. | 280/775 |
| 5,787,759 | 8/1998 | Olgren | 280/777 |

FOREIGN PATENT DOCUMENTS

| | | |
|---|---|---|
| 0600700 | 6/1994 | European Pat. Off. . |
| 19542472 | 2/1997 | Germany . |
| 2092966 | 8/1982 | United Kingdom . |

*Primary Examiner*—Peter C. English
*Attorney, Agent, or Firm*—Brown & Wood, LLP

[57] ABSTRACT

A device for adjusting length, height and/or tilt of a steering column of a motor vehicle and including a steering column tube for receiving a steering column therein, a guide rail for supporting the steering column tube with a possibility of a longitudinal displacement of the steering column tube along the guide rail, a bolt extending through a tubular axle and into the steering column tube through an elongate hole provided in a wall of the steering column tube parallel to a longitudinal extent of the steering column tube and having longitudinal edges provided with serrated slats, a shaped member located in an interior of the steering column tube and having serrated slats engageable with the serrated slats of the longitudinal edges, with the bolt having an inner end fixedly connected with the shaped member, and at least one connecting link located on a side of an actuating lever adjacent to a component fixedly secured to the chassis and displaceable along the tubular axle upon pivoting of the actuating lever.

13 Claims, 5 Drawing Sheets

DEVICE FOR ADJUSTING THE LENGTH, AND/OR HEIGHT, AND/OR TILT OF A STEERING COLUMN OF A MOTOR VEHICLE

BACKGROUND OF THE INVENTION

The present invention relates to a device to be mounted on a steering column of a motor vehicle for adjusting length, and/or height, and/or tilt of the steering column and including a steering column tube, which surrounds the steering column and which is form-lockingly supported in a guide rail with a possibility of displacement in a longitudinal direction, with the guide rail being pivotable about an axis which extends at a right angle to the steering column tube.

The prior art discloses numerous embodiments of devices similar to a device described above.

An object of the present invention is a device of the above-described type having a single actuating lever for adjusting the length, the height, and the tilt of the steering column.

Another object of the present invention is a device of the above-described type which insures that in case of a crash, the steering column is displaced only axially, with the height and tilt positions remaining unchanged.

SUMMARY OF THE INVENTION

These and other objects of the present invention, which will become apparent hereinafter, are achieved by providing a tubular axle fixedly secured to the guide rail, and extending through a component fixedly secured to a chassis of the motor vehicle; a bolt extending through the tubular axle and into the steering column tube through an elongate hole provided in a wall of the steering column tube parallel to a longitudinal extent of the steering column tube, with the elongate hole having longitudinal edges provided with serrated slats, a shaped member located in an interior of the steering column tube and having serrated slats engageable with the serrated slats of the longitudinal edges with the bolt having an inner end fixedly connected with the shaped member; first spring means for biasing the shaped member away from the longitudinal edges; an actuating lever pivotable between a first position, in which the steering column position is fixed, and a second position in which the at least one of the length, height and tilt of the steering column is adjustable; and at least one connecting link located on a side of the actuating lever adjacent to the component fixedly secured to the chassis and displaceable along the tubular axle upon pivoting of the actuating lever between its first and second positions, with the at least one connecting link having on its side facing the steering column tube serrated slat means engaging complementary serrated slats provided on the component fixed to the chassis in the first position of the actuating lever.

In the adjusting device with the foregoing features, a single actuating lever provides for two separate force-locking conditions defining, respectively, height and tilt positions and a longitudinal position of the steering column, with the set breaking point being associated with the longitudinal position of the steering column.

BRIEF DESCRIPTION OF THE DRAWINGS

The features and objects of the present invention will become more apparent, and the invention itself will be best understood from the following detailed description of the preferred embodiments when read with reference to the accompanying drawings, wherein

FIG. 11 shows a plan view of the lower part of the second shaped member of the steering column adjusting device according to the present invention.

DETAILED DESCRIPTION OF THE PREFERRED EMBODIMENTS

Figure 10:
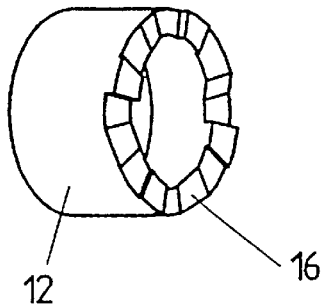
FIG. 10 shows a perspective view of the other link.

A device for adjusting the length, height and/or tilt of a steering column according to the present invention, which is shown in the drawings, includes a guide rail 3 provided on a side of a structural component 1, which component is fixedly mounted on the chassis of a motor vehicle, has a substantially H-shaped cross-section and is provided with a longitudinal opening 2. The guide rail 3 can be pivoted through an angle of several degrees about an axis, which lies behind the plane of the drawing in a plane perpendicular to the plane of the drawing. The pivot axis extends parallel to an axis 4 of a bolt 5 which extends through the opening 2 of the structural component 1. The guide rail 3 has a cut-out guide groove 6 in which a portion of steering column tube 7, which receives a steering column 8, is accommodated. The steering column 8 has a variable length. The portion of the steering column tube which is accommodated in the cut-out groove 6 of the guide rail 3, has a trapezoidal shape and is form-lockingly received in the groove 6. The adjusting device according to the present invention further includes a tubular axle 9, which extends through the opening 2 of the component 1 and is fixedly attached to the guide rail 3. An actuating lever 10 is rotatably supported on the axle 9. One side of the actuating lever abuts a stop 11 formed as a nut fixedly mounted on the tubular axle 9. Two links 12 and 13 are provided on opposite sides of the actuating lever 10. The two links 12 and 13 are axially displaceable along the tubular axle 9 but are secured against rotation thereabout. One of the links, the link 12, has a pot shape (FIG. 10) and is supported against a stop 15 by a spring assembly 14 which is fixedly connected with an end of the bolt 5 extending through the tubular axle 9 and projecting beyond the tubular axle 9. The end surface 16 of the pot-shaped link 12 is formed of a plurality of inclined surfaces which abut corresponding inclined surfaces provided on the actuating lever 10, so that rotation of the actuation lever 10 about the axis 4 causes an axial displacement of the pot-shaped link 12 along the tubular axle 9.

Figure 6:
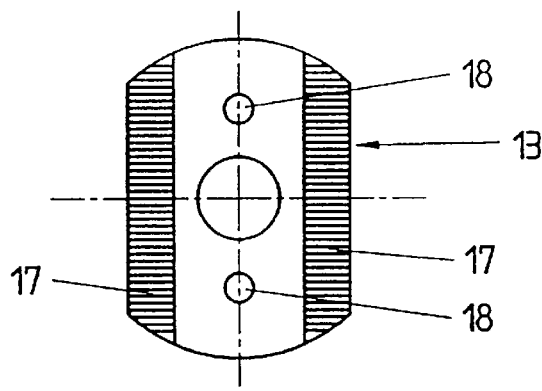
FIG. 6 shows a plan view of one of the two links of the steering column adjusting device according to the present invention.
Figure 8:
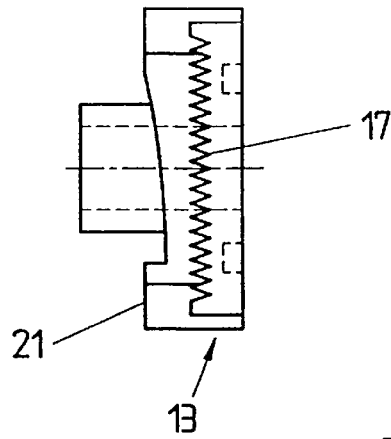
FIG. 8 shows an elevational view of one of the two links.

The second link 13 has two serrated slats 17 (see FIG. 6) between which holes 18 for accommodating springs 19 are provided. The springs 19 have one of their ends supported on a sliding plate 20 which abuts the structural component 1. The end surface 21 of the connecting link 13, facing the actuating lever 10, is also provided with inclined surfaces which abut corresponding inclined surfaces on the actuating lever. The inclined surfaces on the connecting links 12 and 13, adjacent to actuating lever 10, and on the actuating lever 10, are constructed so that, by swiveling the actuating lever 10 in one direction, the two connecting links are displaced away from the actuating lever 10. The serrated slats 17 of the connecting link 13 engage serrated slats 22 provided on the component 1 that is fastened to the chassis.

Figure 5:
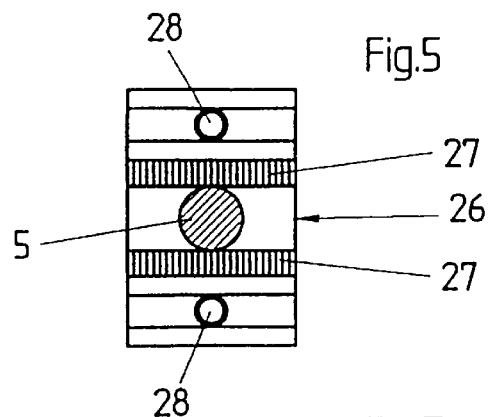
FIG. 5 shows a plan view of the shaped member.
Figure 7:
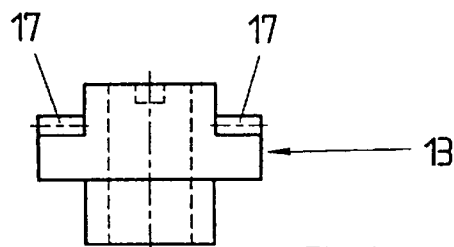
FIG. 7 shows a side view of one of the two links.

A hole 23, which extends in a longitudinal direction of the column tube 7, is provided in the portion of the column tube 7 received in the groove 6 of the guide rail 3. The wall defining the hole 23 has edges 24 bent towards the interior of the column tube 7 and provided with toothing 25 in a form of serrated slats. The bolt 5, which extends through the hole 23 and into the interior of the column tube 7, is connected with a shaped member 26 having a substantially T-shaped cross-section. The bottom of the shaped member 26 is provided, as shown in FIG. 5, with serrated slats 27 which mesh with the toothing 25 of the edges 24. Pre-tensioned springs 28 are provided between the shoulders of the shaped member 26 and the inner surface of the column tube 7.

Figure 9:
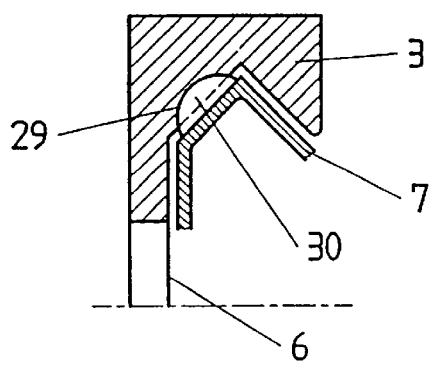
FIG. 9 shows a cross-sectional view of a detail of the guide rail of a steering column adjusting device according to the present invention.

As shown in FIG. 9, hemispherical depressions 29 are provided in the side surfaces of the guide groove 6 for receiving hemispherical caps 30 which support a lateral shoulder of the column tube 7. The portion of the bolt 5, which is located inside the tubular axle 9, has a predetermined breaking point 31. When the actuating lever 10 is in its operating position, the two connecting links 12 and 13 are displaced away from the actuating lever 10, with the connecting links 12 and 13 being displaced to the left and the right, respectively. Upon displacement of the connecting link 13 to the right, the serrated slats provided on the connecting link 13 engage those of the component 1 under the bias of the springs 19. Upon being displaced to the left, the connection link 12 compresses the spring assembly 14 which, being fixedly connected with the bolt 5, pulls the bolt 5 leftward, causing the engagement of the serrated slats 27 of the shaped member 26 with the toothing 25 provided on the edges 24 of the wall of the steering column tube 7. As a result, the steering column tube 7, which receives the steering column 8, becomes clamped to the structural component 1 fixedly secured on the motor vehicle chassis. When the length of the steering column (in a plane extending perpendicular to the plane of the drawing of FIG. 1) and/or the tilt of the steering column (in the directions indicated by arrow 32) need be adjusted, the actuating lever 10 is pivoted from its operating position, in which the steering column is fixed with respect to the motor vehicle chassis, by a right angle to the plane of the drawing (of FIG. 1). As a result, the connecting links 12 and 13 move toward each other, with the link 13 becoming disengaged from the structural component 1 and with the shaped member 26 becoming disengaged from the guide rail 3. The springs 19 and the springs 28 retain the link 13 and the shaped member 26 in their disengaged positions, respectively. The steering column tube 7, together with the steering column 8, can now be shifted in guiding groove 6 of the guide rail 3 and can be swiveled about its axis lying behind the plane of the drawing (as shown by arrow 32). The position, now assumed by the parts mentioned, is locked when the actuating lever 10 is swiveled back once again into its initial position displacing, at the same time, the connecting links 12 and 13 away from each other. As a result, the link 13 and the shaped member 26 move into engagement with the structural component 1 and the guide rail 3, respectively.

If a force, caused by an accident, acts axially on the steering column, the predetermined breaking point 31 of the bolt 5 is sheared off and the steering column is displaced in the longitudinal direction in the guiding groove 6. The set tilt position, however, remains unchanged.

Figure 1:
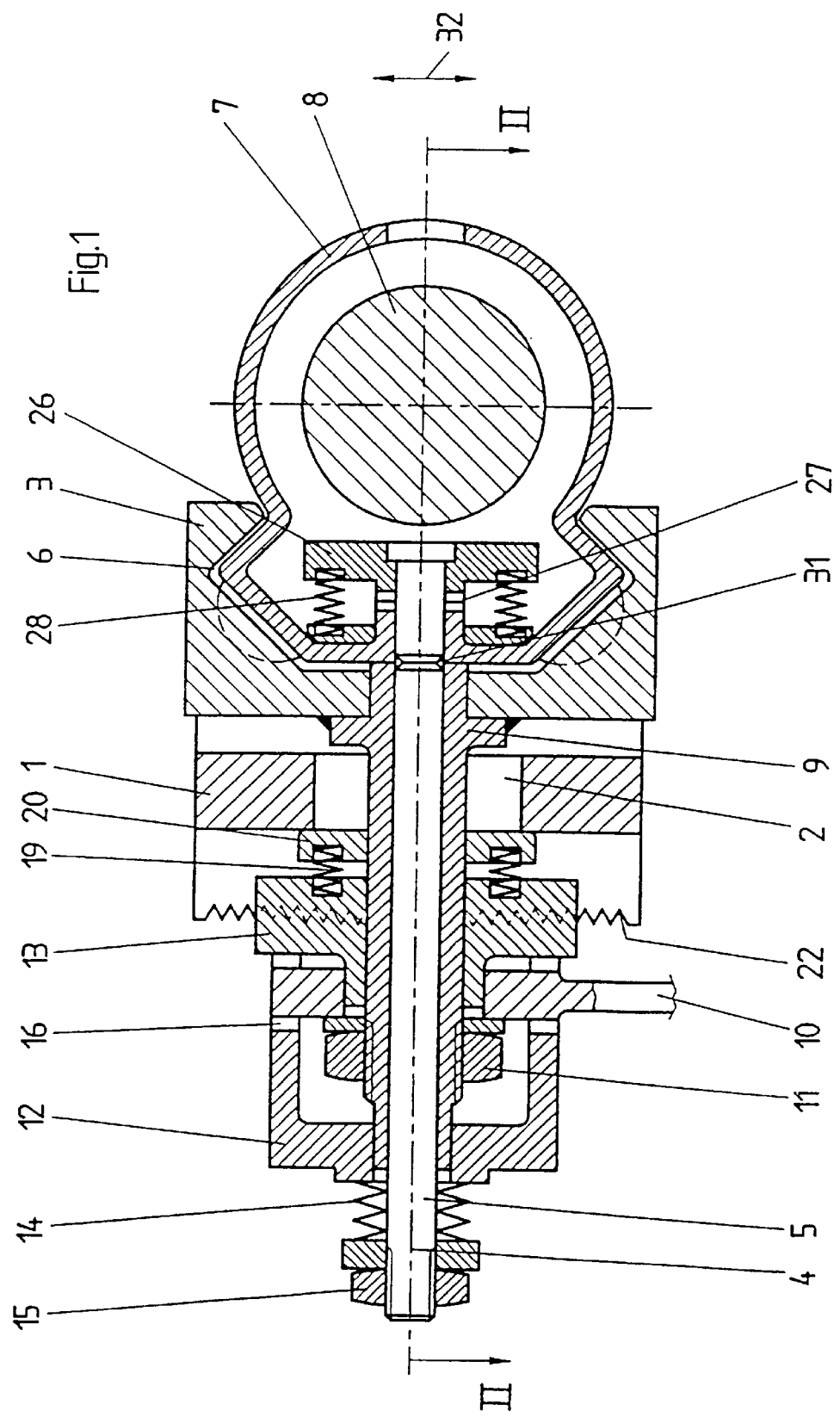
FIG. 1 shows a transverse cross-sectional view of a first embodiment of a steering column adjusting device according to the present invention.
Figure 2:
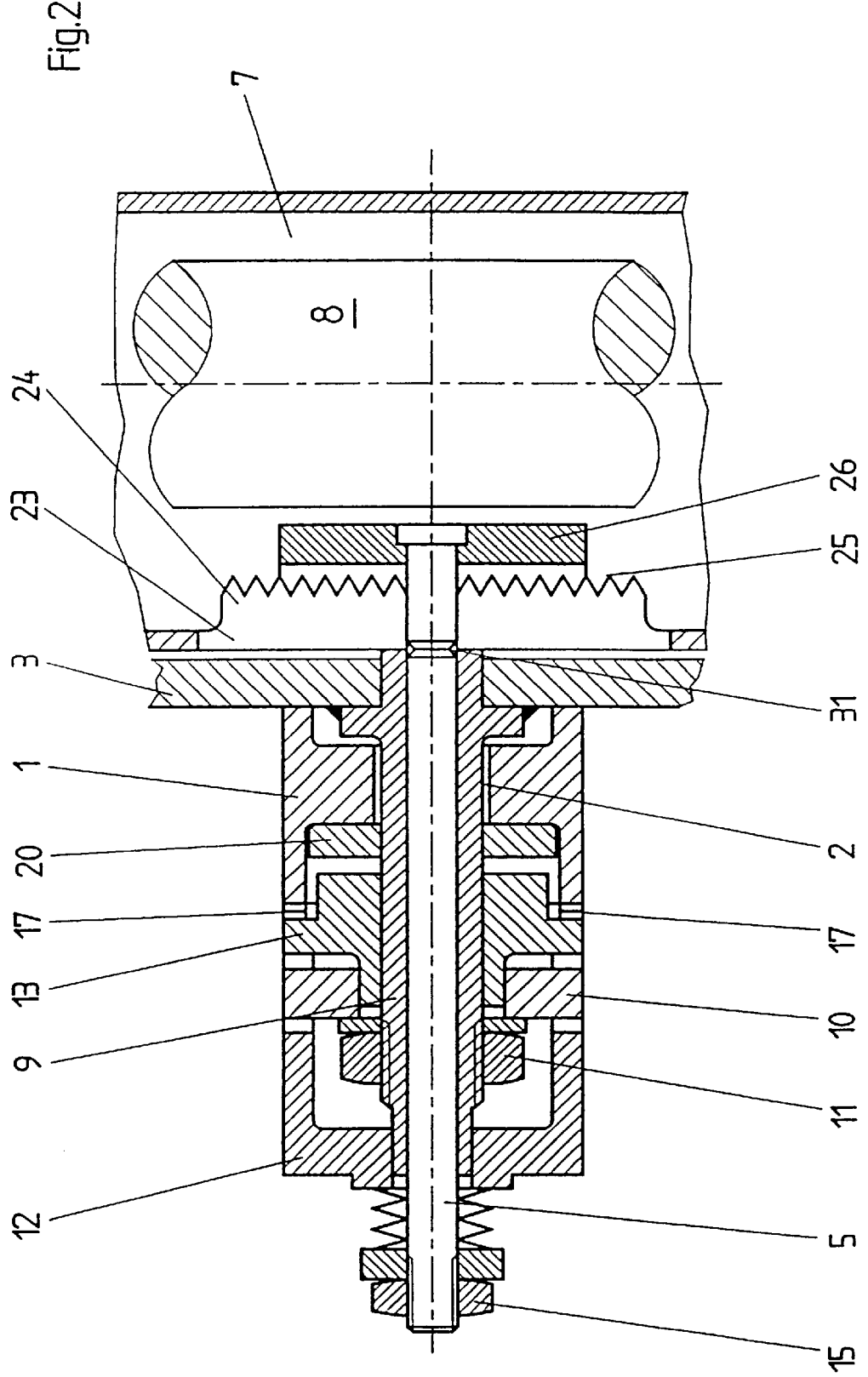
FIG. 2 shows a longitudinal cross-sectional view of the first embodiment of a steering column adjusting device according to the present invention taken along line II—II in FIG. 1.

In the embodiment of FIGS. 1 and 2, the axial tension, acting on the bolt 5, is transferred to the predetermined breaking point 31.

Figure 3:
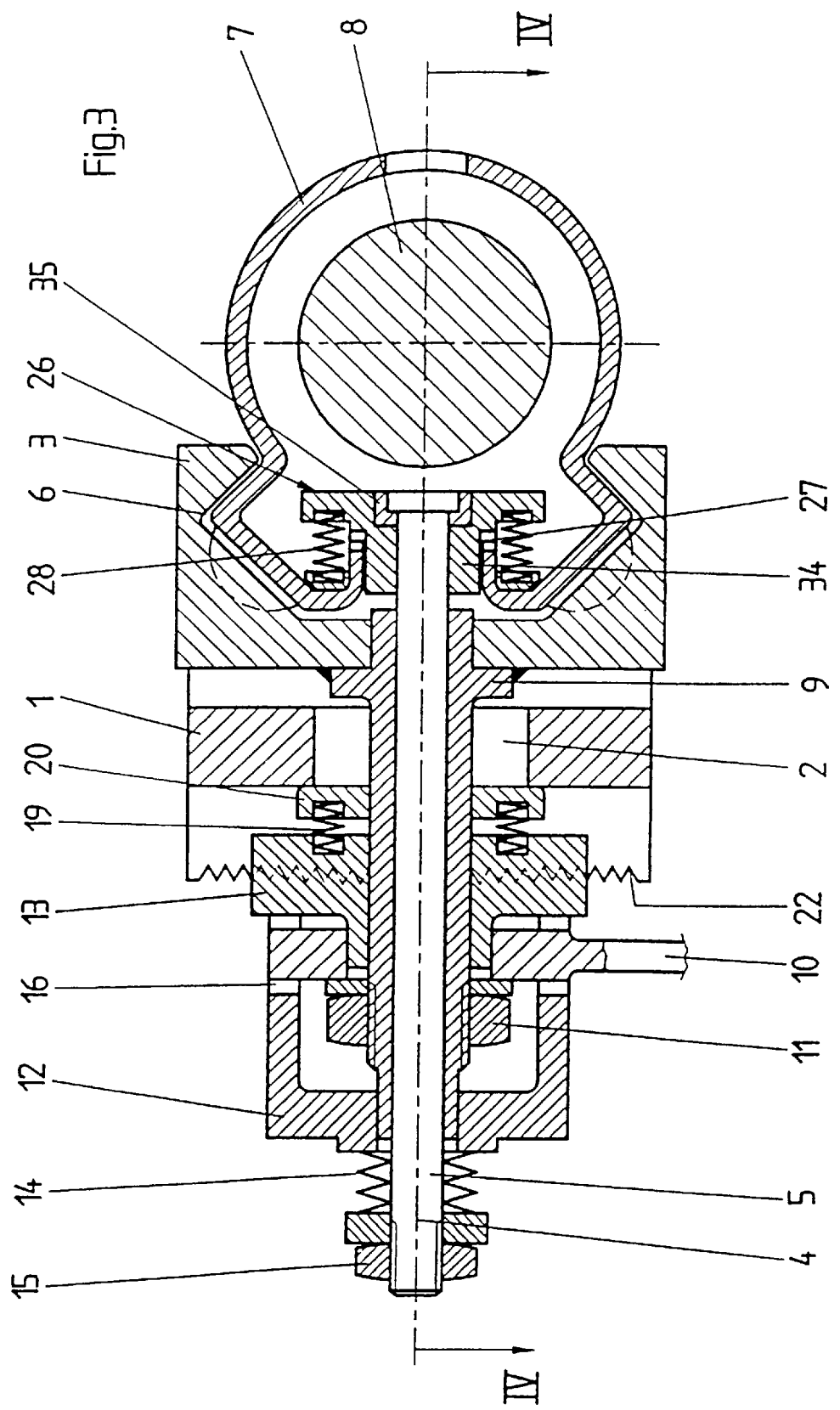
FIG. 3 shows a transverse cross-sectional view of a second embodiment of a steering column adjusting device according to the present invention.
Figure 4:
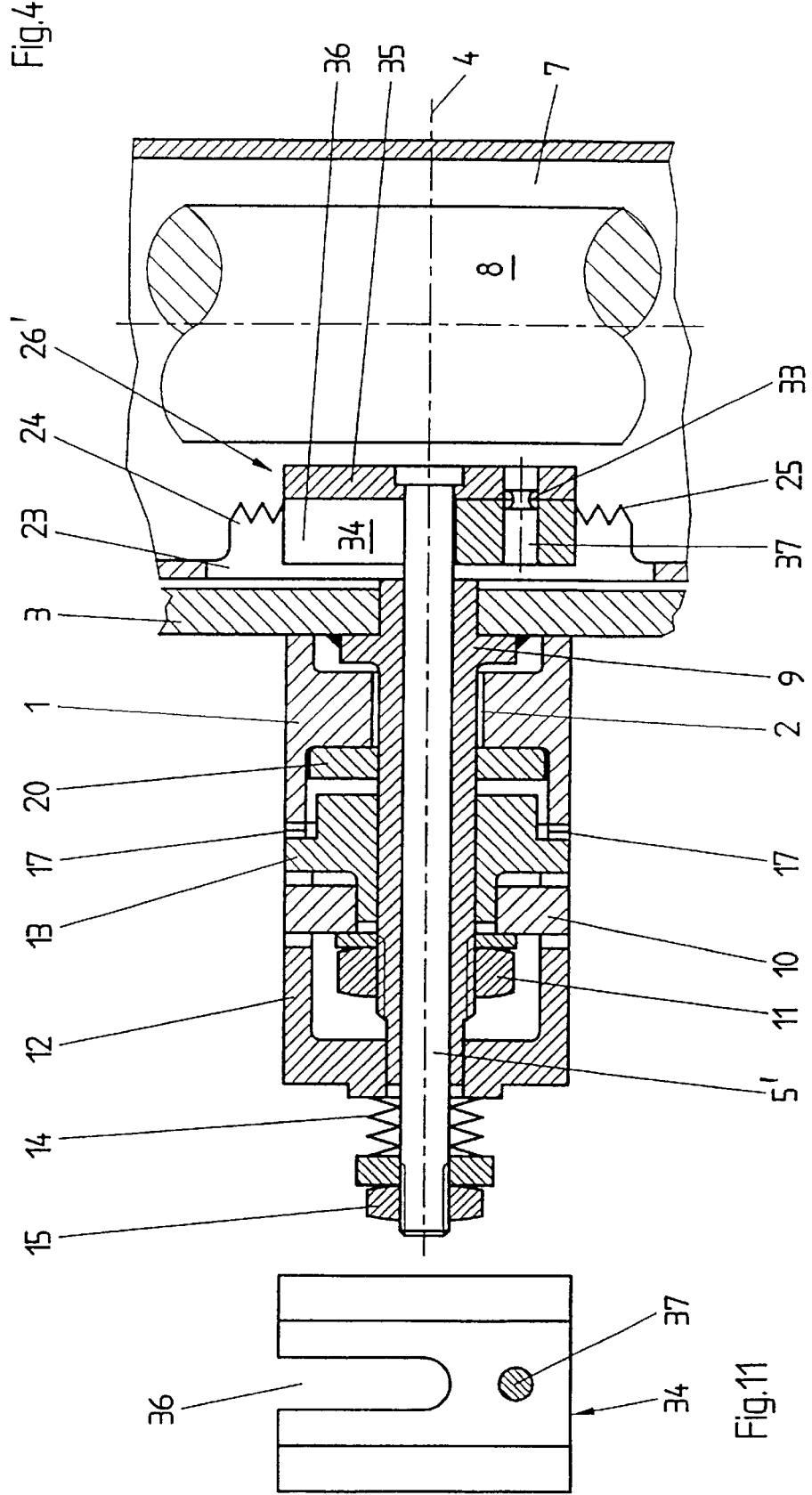
FIG. 4 shows a longitudinal cross-sectional view of a second embodiment of a steering column adjusting device according to the present invention taken along line IV—IV in FIG. 3.

In the embodiment of FIGS. 3 and 4, the predetermined breaking point 33, which is provided here, is not acted upon by a load. This embodiment differs from the embodiment of FIGS. 1 and 2 in that the bolt 5' has a uniform cross section over its entire length, and the shaped member 26' has a different shape. The member has a U-shaped lower part 34 (FIG. 11) and a panel-shaped upper part 35. These two parts are connected by a shearing bolt 37 with the predetermined breaking point 33. The predetermined breaking point 33 is located in the plane separating these two parts. The axis of the bolt 5', that of the shearing bolt 37 and the longitudinal axis of the opening 36, which is open on one side, preferably lie in one plane. In this embodiment, the predetermined breaking point 33 is not under load, irrespective of the tension applied to the bolt 5'.

In the shown embodiment, the springs 19 and 28 are constructed as helical springs. It is, however, also within the scope of the invention to provide leaf springs here, which are guided more easily than are helical springs. Aside from the configuration of the shaped member 26,26' and of the bolt 5,5' the two embodiments are substantially similar. For this reason, the similar parts have been provided with the same reference numerals.

In the shown embodiments, connecting links 12, 13, which serve to tighten or loosen the bolt 5,5' and which bring the serrations into and out of engagement, are provided on opposite sides of the actuating lever 10.

However, only one connecting link can be disposed on a side of the actuating lever. Instead of abutting surfaces, which lie directly against one another, there may be rollers between the inclined surfaces. The arrangement in all cases should be such that a structural part, mounted on the tubular axle 9, is shifted axially by a swiveling movement of the actuating lever 10 about the axis of the bolt 5,5'. Devices of this type are known, for example, from EP 600 700 A1 or GB 2 092 966 A2.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A device for adjusting at least one of the length, height and tilt of a steering column of a motor vehicle, the device comprising:

a steering column tube for receiving a steering column therein;

a guide rail for supporting the steering column tube with a possibility of a longitudinal displacement of the steering column tube along the guide rail, the steering column tube being form-lockingly connected with the guide rail, and the guide rail being pivotable about a pivot axis extending perpendicular to the steering column tube;

a tubular axle fixedly secured to the guide rail and extending through a component fixedly secured to a chassis of the motor vehicle;

a bolt extending through the tubular axle and into the steering column tube through an elongate hole provided in a wall of the steering column tube parallel to a longitudinal extent of the steering column tube, the elongate hole having longitudinal edges provided with serrated slats;

a shaped member located in an interior of the steering column tube and having serrated slats engageable with the serrated slats of the longitudinal edges, the bolt having an inner end fixedly connected with the shaped member; a first spring for biasing the shaped member away from the longitudinal edges;

an actuating lever pivotable between a first position, in which the steering column position is fixed, and a second position in which the at least one of the length, height and tilt of the steering column is adjustable; and at least one connecting link located on a side of the actuating lever adjacent to the component fixedly secured to the chassis and displaceable along the tubular axle upon pivoting of the actuating lever between the first and second positions thereof, the at least one connecting link having, on side thereof facing the steering column tube, serrated slats engaging complementary serrated slats provided on the component, which is fixed to the chassis, in the first position of the actuating lever.

2. A device as set forth in claim 1, wherein the actuating lever is pivotally supported on the tubular axle.

3. A device as set forth in claim 2, further comprising a stop for the actuating lever and located on a side of the actuating lever remote from the steering column tube, the stop being fixedly supported on the tubular axle.

4. A device as set forth in claim 1, further comprising another connecting link located on a side of the actuating lever remote from the steering column tube and connected with an outer end of the bolt.

5. A device as set forth in claim 4, wherein the outer end of the bolt projects beyond the tubular axle, and wherein the device further comprises a stop secured to the bolt outer end, and a spring assembly located between a stop secured to the bolt outer end and the another connecting link.

6. A device as set forth in claim 1, further comprising a second spring for biasing the at least one connection link away from the component fixed to the chassis.

7. A device as set forth in claim 1, further comprising a set breaking point provided in a region of the steering column tube for interrupting a positive connection between the steering column tube and the bolt upon a force, which is caused by an accident, being applied to the steering column in a longitudinal direction thereof.

8. A device as set forth in claim 7, wherein the set breaking point is provided in the bolt in a plane of the bolt which coincides with an end of the tubular axle adjacent to the steering column tube.

9. A device as set forth in claim 7, wherein the shaped member has a first part, which is provided with the serrated slots and has a hole through which the inner end of the bolt extends, a second part with which the bolt is fixedly connected, and a shearing bolt connecting the first and second parts and defining the set breaking point.

10. A device as set forth in claim 9, wherein axes of the bolts and the shearing bolt lie in one plane.

11. A device as set forth in claim 1, wherein the longitudinal edges of the elongate hole are bent inward with respect to the interior of the steering column tube.

12. A device as set forth in claim 1, wherein the steering column tube has a trapeziodally shaped lateral shoulder, and the guide rail has a groove for form-lockingly receiving the lateral shoulder.

13. A device as set forth in claim 12, wherein the groove is provided with hemispherical depressions, and wherein the device further comprises hemispherical caps located in the depressions for supporting the lateral shoulder of the steering volume tube.

* * * * *